United States Patent
Wang et al.

(10) Patent No.: US 11,201,712 B2
(45) Date of Patent: *Dec. 14, 2021

(54) FACILITATING INCREMENTAL DOWNLINK CONTROL INFORMATION DESIGN TO SUPPORT DOWNLINK CONTROL INFORMATION SCHEDULING

(71) Applicant: AT&T Intellectual Property I, L.P., Atlanta, GA (US)

(72) Inventors: Xiaoyi Wang, Austin, TX (US); Arunabha Ghosh, Austin, TX (US); Salam Akoum, Austin, TX (US); Ralf Bendlin, Cedar Park, TX (US); Sairamesh Nammi, Kista (SE)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/732,482

(22) Filed: Jan. 2, 2020

(65) Prior Publication Data

US 2020/0136776 A1    Apr. 30, 2020

Related U.S. Application Data

(63) Continuation of application No. 15/587,344, filed on May 4, 2017, now Pat. No. 10,554,363.

(51) Int. Cl.
*H04L 5/00* (2006.01)
*H04W 72/12* (2009.01)

(52) U.S. Cl.
CPC .......... *H04L 5/0051* (2013.01); *H04L 5/0053* (2013.01); *H04L 5/0092* (2013.01); *H04W 72/1289* (2013.01)

(58) Field of Classification Search
CPC ... H04L 5/0051; H04L 5/0092; H04L 5/0053; H04W 72/1289
See application file for complete search history.

(56) References Cited

U.S. PATENT DOCUMENTS

| 8,867,519 | B2 | 10/2014 | Kim et al. |
| 8,891,416 | B2 | 11/2014 | Yvang et al. |
| | | (Continued) | |

FOREIGN PATENT DOCUMENTS

| WO | 2016/165653 A1 | 10/2016 |
| WO | 2016/195177 A1 | 12/2016 |
| WO | 2017/051847 A1 | 3/2017 |

OTHER PUBLICATIONS

Non-Final Office Action received for U.S. Appl. No. 15/587,344 dated Jul. 31, 2018, 33 pages.

(Continued)

*Primary Examiner* — Harry H Kim
(74) *Attorney, Agent, or Firm* — Amin, Turocy & Watson, LLP

(57) ABSTRACT

A system facilitating incremental downlink control information (DCI) design to support DCI scheduling in a wireless communication system is provided. In one embodiment, the an apparatus comprises: a processor; and a memory that stores executable instructions that, when executed by the processor, facilitate performance of operations. The operations comprise: receiving first downlink control information associated with a first search space of a downlink control channel, wherein the first search space is of a first size; and receiving second downlink control information associated with a second search space of the downlink control channel, wherein the second search space is of a second size that is less than the first size, and wherein the second downlink control information comprises incremental downlink control (Continued)

information that is distinct from the first downlink control information.

20 Claims, 10 Drawing Sheets

(56) References Cited

U.S. PATENT DOCUMENTS

| | | | |
|---|---|---|---|
| 9,445,429 B2 | 9/2016 | Tabet et al. | |
| 9,538,515 B2 | 1/2017 | Papasakellariou et al. | |
| 9,590,786 B2 | 3/2017 | Chae et al. | |
| 9,642,140 B2 | 5/2017 | Ng et al. | |
| 10,554,363 B2* | 2/2020 | Wang | H04L 5/0053 |
| 2013/0065585 A1* | 3/2013 | Pelletier | G06Q 30/0267 |
| | | | 455/435.1 |
| 2013/0121274 A1 | 5/2013 | Chen et al. | |
| 2013/0287064 A1 | 10/2013 | Soe et al. | |
| 2015/0181576 A1 | 6/2015 | Papasakellariou et al. | |
| 2015/0189574 A1 | 7/2015 | Ng et al. | |
| 2015/0237675 A1 | 8/2015 | Su et al. | |
| 2015/0245379 A1 | 8/2015 | Nguyen | |
| 2015/0257164 A1 | 9/2015 | Lim et al. | |
| 2015/0282208 A1 | 10/2015 | Yi et al. | |
| 2015/0319777 A1 | 11/2015 | Sea et al. | |
| 2016/0128028 A1 | 5/2016 | Mallik et al. | |
| 2016/0205664 A1 | 7/2016 | Zhang et al. | |
| 2016/0219587 A1 | 7/2016 | Lin et al. | |
| 2016/0295561 A1 | 10/2016 | Papasakellariou | |
| 2017/0013618 A1 | 1/2017 | Shin et al. | |
| 2017/0048880 A1 | 2/2017 | Anderson et al. | |
| 2017/0238260 A1 | 8/2017 | Kim et al. | |
| 2018/0124753 A1* | 5/2018 | Sun | H04W 72/042 |
| 2018/0324845 A1* | 11/2018 | Wang | H04W 72/1289 |
| 2019/0190660 A1* | 6/2019 | Liu | H04L 1/1678 |
| 2020/0146027 A1* | 5/2020 | Seo | H04L 5/0092 |
| 2020/0195388 A1* | 6/2020 | Seo | H04L 1/00 |

OTHER PUBLICATIONS

Non-Final Office Action received for U.S. Appl. No. 15/587,344 dated May 3, 2019, 28 pages.

Final Office Action received for U.S. Appl. No. 15/587,344 dated Dec. 14, 2018, 27 pages.

* cited by examiner

FACILITATING INCREMENTAL DOWNLINK CONTROL INFORMATION DESIGN TO SUPPORT DOWNLINK CONTROL INFORMATION SCHEDULING

RELATED APPLICATION

The subject patent application is a continuation of, and claims priority to, U.S. patent application Ser. No. 15/587,344, filed May 4, 2017, and entitled "FACILITATING INCREMENTAL DOWNLINK CONTROL INFORMATION DESIGN TO SUPPORT DOWNLINK CONTROL INFORMATION SCHEDULING," the entirety of which application is hereby incorporated by reference herein.

TECHNICAL FIELD

The subject disclosure relates generally to communications systems, and, for example, to systems, methods and/or machine-readable storage media for facilitating incremental downlink control information (DCI) design to support DCI scheduling in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
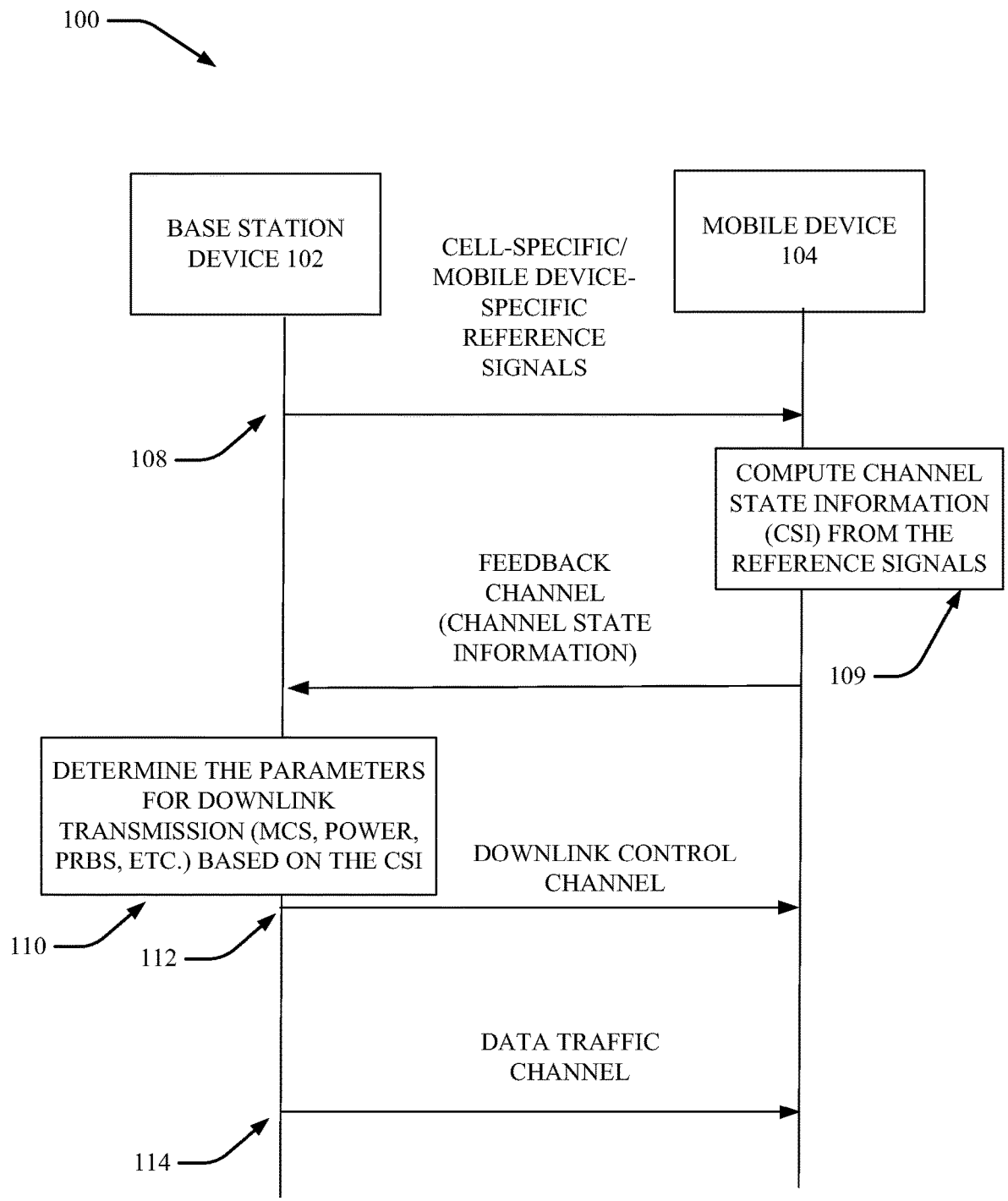
FIG. 1 illustrates an example, non-limiting message sequence flow chart to facilitate downlink data transfer with a single downlink control information (DCI) in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration.

Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In some wireless communication systems, one solution on multi-PDSCH grant is to use a new, independent DCI for each scheduled one PDSCH. While this solution is simple, there is significant signaling overhead introduced since a great deal of the information transmitted via signaling might be common between the two PDSCH grants. Hence, this waste in turn reduces the number of resources for PDSCH transmission thereby reducing the link throughput and system capacity. Hence an efficient solution to signal the scheduling grants when multiple DCIs are invoked is desired.

One or more embodiments can facilitate transmitting the DCI with multiple scheduling grants. For example, one or more embodiments can comprise an enhanced packet data control channel (PDCCH) search space that supports incremental DCI design. The size of the incremental DCI can be indicated by the base DCI, which means the frameworks for the one or more embodiments can support variable sizes of DCI. Although the size of an incremental DCI can depend on the base DCI, the base DCI can schedule an independent data channel. Both DL and UL DCI can be transmitted from the BS device and/or network to the mobile device. The DL DCI can be employed to schedule PDSCH which is transmitted from the BS device and/or network to the mobile device while the DL DCI can be used to schedule PUSCH, which is from the mobile device to the BS device and/or network. The incremental DCI can be UL DCI in some embodiments.

Also, the incremental DCI may only contain the information that is different from base DCI (e.g., the base DCI can schedule a rank 1 PDSCH on wideband while the incremental DCI can schedules a subband high rank PDSCH (e.g., a higher rank than 1), which overwrites the scheduling from base DCI). In some embodiments, an example use case is that the base DCI schedule only rank equal to 1 PDSCH while incremental DCI schedules PDSCH on the same frequency resources on other layers (e.g., layer 2). So the total rank becomes 2.

Systems, methods and/or machine-readable storage media for incremental downlink control information (DCI) design to support DCI scheduling in a wireless communication system in accordance with one or more embodiments are provided herein. Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (NR) access. Accordingly, systems, methods and/or machine-readable storage media for facilitating incremental downlink control information (DCI) design to support DCI scheduling in a wireless communication system in accordance with one or more embodiments are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G;

improvement in coverage relative to 4G; signaling efficiency enhanced compared to 4G; and/or latency significantly reduced compared to LTE.

In one embodiment, an apparatus is provided. The apparatus can comprise: a processor; and a memory that stores executable instructions that, when executed by the processor, facilitate performance of operations. The operations can comprise: receiving first downlink control information associated with a first search space of a downlink control channel, wherein the first search space is of a first size; and receiving second downlink control information associated with a second search space of the downlink control channel, wherein the second search space is of a second size that is less than the first size, and wherein the second downlink control information comprises incremental downlink control information that is distinct from the first downlink control information.

In another embodiment, a method is provided. The method comprises: determining, by a base station device comprising a processor, a first number of scheduling grants for uplink data transmission by a mobile device to the base station device; facilitating transmitting, by the base station device, first downlink control information associated with a first search space and comprising a first size, of a downlink control channel; and facilitating transmitting, by the base station device, second downlink control information associated with a second search space, comprising a second size, of the downlink control channel, wherein the second size is less than the first size, and wherein the second downlink control information comprises incremental downlink control information, the incremental downlink control information being information that excludes the first downlink control information In another embodiment, a machine-readable storage medium is provided. The machine-readable storage medium can comprise executable instructions that, when executed by a processor, facilitate performance of operations, comprising: determining a first number of scheduling grants for uplink data transmission by a mobile device to a base station device; transmitting first downlink control information associated with a first search space of a downlink control channel, the first search space comprising a first size; and transmitting second downlink control information associated with a second search space of the downlink control channel, the second search space comprising a second size, wherein the second size is less than the first size, and wherein the second downlink control information comprises incremental downlink control information.

One or more embodiments can allow the existence of different DCI sizes since the downlink DCI and uplink DCI can be different sizes. For example, the downlink DCI can be a base DCI while the uplink DCI can be the incremental DCI. The two DCI can be independently scheduled but the size of uplink DCI can be indicated by the downlink DCI. One or more embodiments can also allow one DCI as an incremental DCI that is a complementary DCI to a base DCI (e., the base DCI can schedule a wideband rank 1 physical downlink shared channel (PDSCH) while the incremental DCI can schedule a subband but high rank PDSCH).

FIG. 1 illustrates an example, non-limiting message sequence flow chart to facilitate downlink data transfer with a single downlink control information (DCI) in accordance with one or more embodiments described herein. As used herein, the term "BS device 102" can be interchangeable with (or include) a network, a network controller or any number of other network components.

One or more embodiments of the system 100 can facilitate transmitting the DCI with multiple scheduling grants. For example, one or more embodiments of the system 100 can comprise an enhanced packet data control channel (PDCCH) search space that supports incremental DCI design. The size of the incremental DCI can be indicated by the base DCI, which means the frameworks for the one or more embodiments can support variable sizes of DCI. Although the size of an incremental DCI can depend on the base DCI, the base DCI can schedule an independent data channel (e.g., the base DCI can schedule downlink data while the incremental DCI can schedule uplink data). Also, the incremental DCI may only contain the information that is different from base DCI (e.g., the base DCI can schedule a rank 1 PDSCH on wideband while the incremental DCI can schedules a subband high rank PDSCH, which can overwrite the scheduling from base DCI).

FIG. 1 shows the typical message sequence chart for downlink data transfer in wireless communication (e.g., 5G, LTE, etc.) systems. As shown, one or more of reference signals and/or pilot signals can be transmitted as shown at 108 of FIG. 1. The reference signals and/or the pilot signals can be beamformed or non-beamformed. From the pilot or reference signals, the mobile device 104 can compute the channel estimates then compute the parameters needed for CSI reporting. The CSI report can include, but is not limited to, channel quality indicator (CQI), preceding matrix index (PMI), rank information (RI) CSI-RS Resource Indicator (CRI) (which can be the same as beam indicator), etc.

At 109, the CSI report can be sent to the BS device 102 and/or the network from the mobile device 102 via a feedback channel either on request from the BS device 102 and/or the network aperiodically or can be configured to report periodically. At 110, the BS device 102 scheduler and/or the network scheduler can use this information in choosing the parameters for scheduling of this particular mobile device 104. The BS device 102 and/or the network can send the scheduling parameters to the mobile device 104 in the downlink (DL) control channel at 112.

The downlink control channel can carry information about the scheduling grants. As previously discussed, typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Additionally, typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

In some embodiments, downlink control channel can also carry data in one or more subcarriers of an OFDM control channel symbol to improve efficiency of the control channel. As shown in FIG. 1, the downlink control channel can include data or control channel information. In various embodiments, the systems described herein can provide approaches for the control channel transmission.

After such scheduling, the actual data transfer can take place from BS device 102 and/or the network to the mobile device 104 at 114.

For multi-DCI based scheduling (scheduling in which each DL data transfer is scheduled by a base DCI), the main intention is to allow the BS device 102 and/or the network to grant multiple DCI and for each granted DCI to schedule one PDSCH to the mobile device 104. There are several use cases. In one example, the PDSCHs come from different total radiated power (TRP) (e.g., on-coherent joint transmission (JT)). In another example, the PDSCHs are on different bandwidth (e.g., some PDSCH can be scheduled on some bands and other PDSCH can be scheduled on other bands). In another example, the PDSCHs are on different spatial layers (e.g., one PDSCH can be on demodulation reference signal (DMRS) port 7,8 and another PDSCH can be on DMRS port 9,10). In each of these three cases, the mobile device 104 may receive multiple PDSCH and each PDSCH is scheduled by one DCI (e.g., each DCI schedules a PDSCH). In some of these cases, then multiple DCI can be transmitted for multiple PDSCH but this creates waste because some DCI may carry the redundant information.

In one or more embodiments described herein, there is one base DCI with core information and an incremental DCI that includes information that is different from that in the base DCI to reduce waste. One or more of these embodiments will be described with reference to FIGS. 2, 3, 4, 5, 6, 7, 8 and 9.

Figure 2:
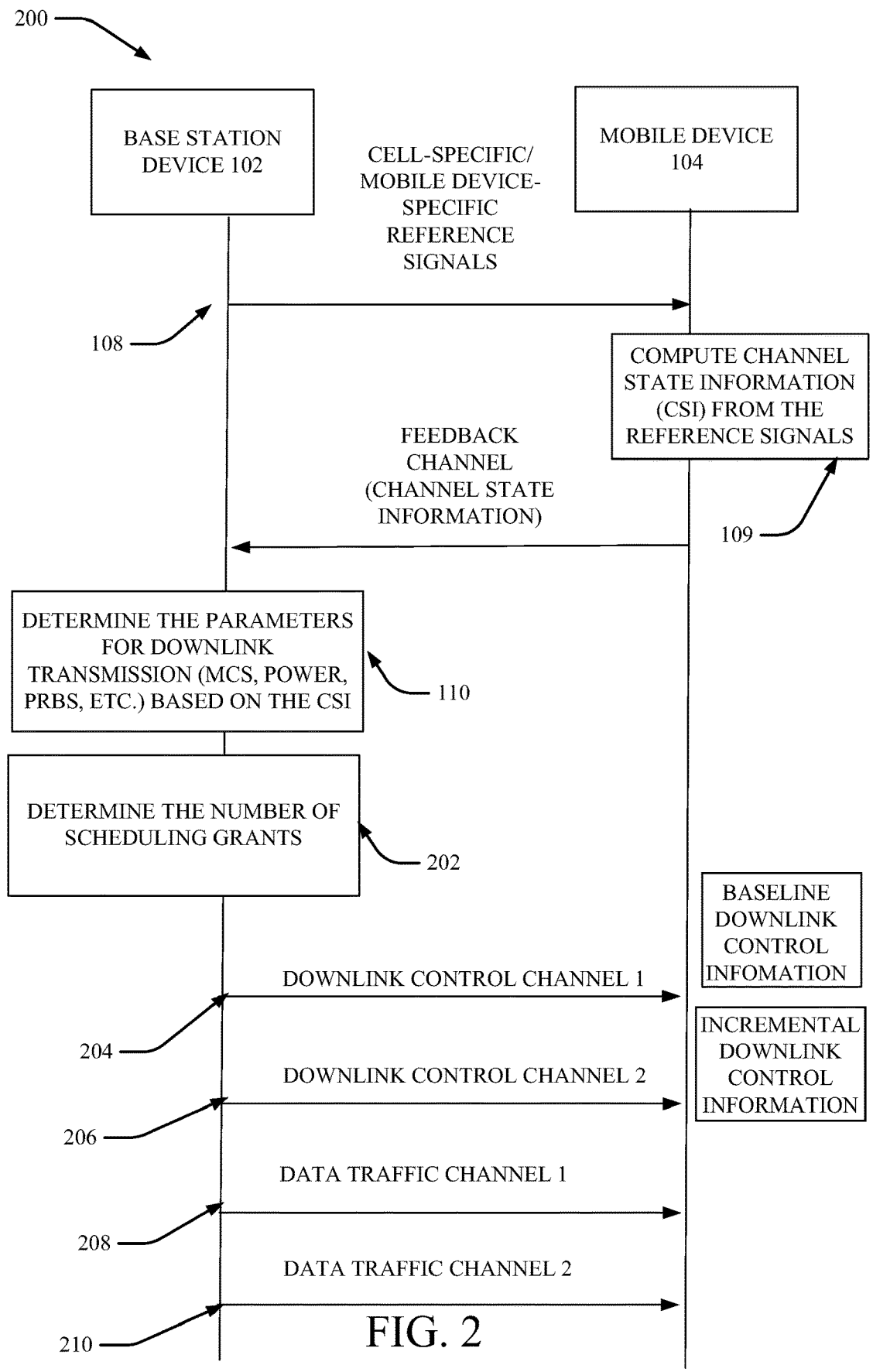
FIG. 2 illustrates an example, non-limiting message sequence flow chart to facilitate downlink data transfer with multiple DCI in accordance with one or more embodiments described herein.

FIG. 2 illustrates an example, non-limiting message sequence flow chart to facilitate downlink data transfer with multiple DCI in accordance with one or more embodiments described herein. Repetitive description of like elements employed in other embodiments described herein is omitted for sake of brevity.

As shown, the difference between system 200 of FIG. 2 and system 100 of FIG. 1 is that the second downlink control channel, which is referred to as downlink control channel 2 at 206, is indicated by an incremental DCI instead of being indicated by another base DCI. The first downlink control channel, which is referred to as "downlink control channel 1" at 204, is indicated by a base DCI as with system 100. The downlink control channel 1 transmits base DCI at 204 to provide a scheduling grant for data traffic channel 1 at 208. The downlink control channel 2 transmits an incremental DCI at 206 to provide a scheduling grant for data traffic channel 2 at 210.

As also shown in FIG. 2, the BS device 102 of system 200 can determine a number of scheduling grants to transmit to the mobile device 104. The number of scheduling grants shown in FIG. 2 is two scheduling grants (one for each data traffic channel). In other embodiments, any number of scheduling grants can be determined and/or provided by the BS device 102 in accordance with the number of data traffic channels to be scheduled. In various embodiments, the first of a group of DCI can be a base DCI (e.g., for data traffic channel 1). Subsequent DCI can be incremental DCI. In some embodiments, the incremental DCI can include only information that is different from and/or in addition to the information in the base DCI.

Figure 3:
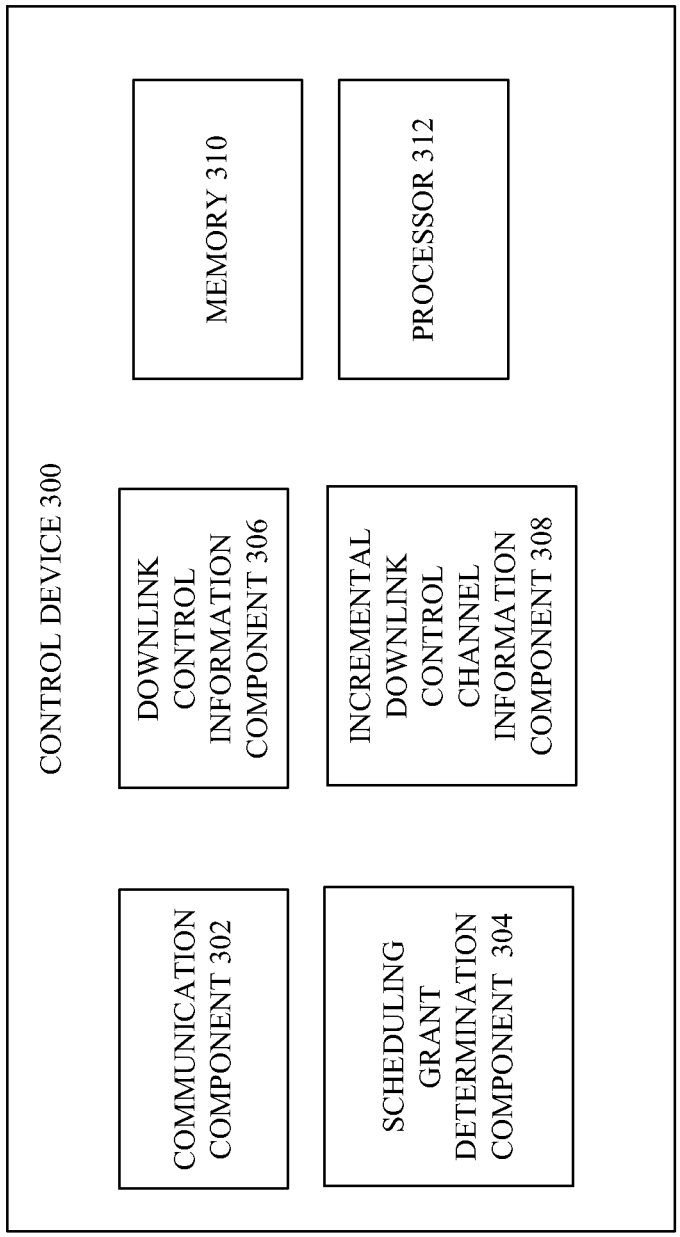
FIG. 3 illustrates an example, non-limiting block diagram of a control device that can facilitate incremental DCI design to support DCI scheduling in a wireless communication system in accordance with one or more embodiments described herein.
Figure 4:
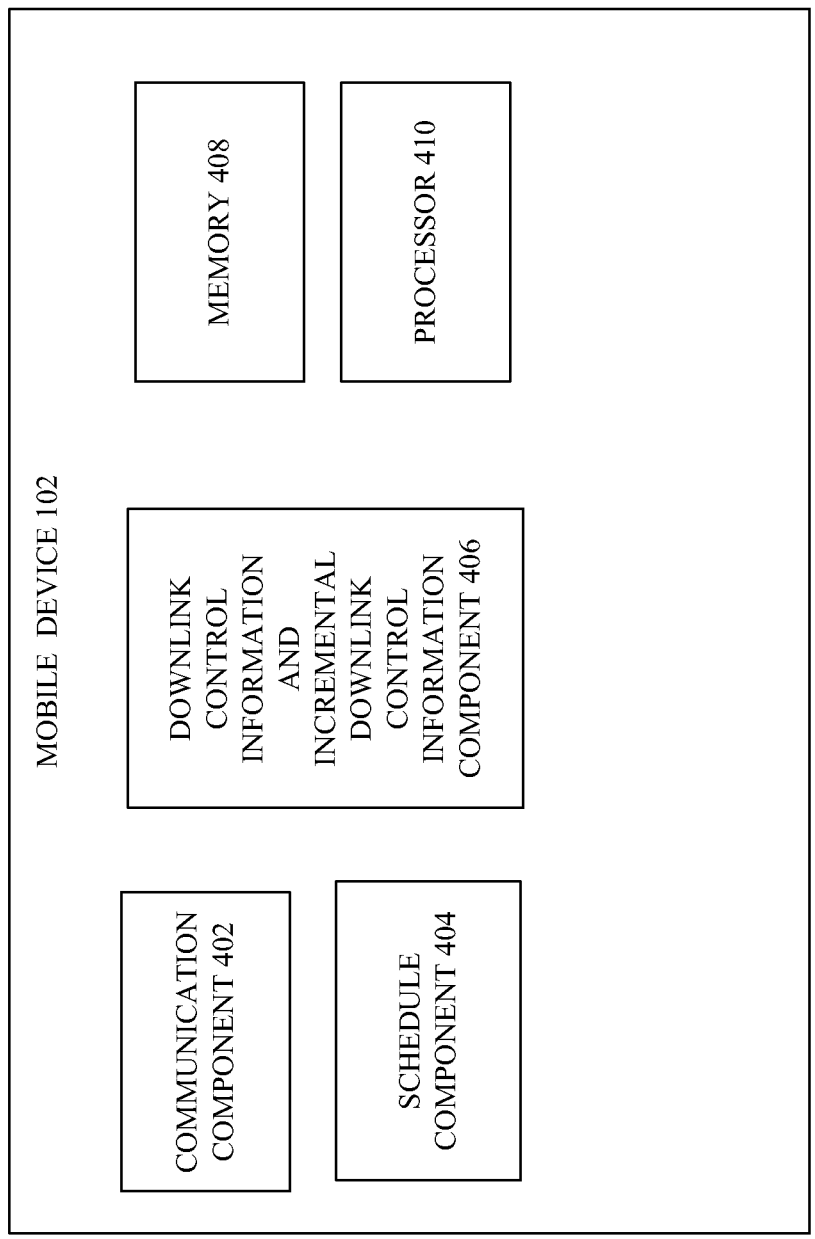
FIG. 4 illustrates an example, non-limiting block diagram of a mobile device for which incremental DCI design can be provided to support DCI scheduling in a wireless communication system in accordance with one or more embodiments described herein.

FIG. 3 illustrates an example, non-limiting block diagram of a control device that can facilitate incremental DCI design to support DCI scheduling in a wireless communication system in accordance with one or more embodiments described herein. FIG. 4 illustrates an example, non-limiting block diagram of a mobile device for which incremental DCI design can be provided to support DCI scheduling in a wireless communication system in accordance with one or more embodiments described herein. Repetitive description of like elements employed in other embodiments described herein is omitted for sake of brevity.

Turning first to FIG. 3, the control device 300 can be comprised in the BS device 102 and/or any other network control device that can generate information for control of the information to be transmitted on the downlink control channel. In one or more embodiments, the BS device 102 and/or the control device 300 can indicate a DCI and/or incremental DCI for one or more mobile devices. The control device 300 can comprise communication component 302, scheduling grant determination component 304, DCI component 306, incremental DCI component 308, memory 310 and/or processor 312. In some embodiments, one or more of communication component 302, scheduling grant determination component 304, DCI component 306, incremental DCI component 308, memory 310 and/or processor 312 can be electrically and/or communicatively coupled to one another to perform one or more functions of control device 300. As described, in one or more embodiment, the control device 300 can have or include (or be included in) the structure and/or functionality of one or more aspects of the BS device 102.

The communication component 302 can transmit and/or receive control and/or data information to and/or from one or more mobile devices (e.g., mobile device 104). In some embodiments, the communication component 302 can transmit downlink control channel signaling such as that shown in FIG. 2 at downlink control channel 1 at 204 of system 200 and downlink control channel 2 at 206 of system 200.

The memory 310 can be a computer-readable storage medium storing computer-executable instructions and/or information configured to perform one or more of the functions described herein with reference to the control device 300. For example, in some embodiments, the memory 310 can store computer-readable storage media associated with determining a number of scheduling grants for one or more mobile devices (e.g., mobile device 104), generating base DCI and/or incremental DCI, etc. The processor 312 can perform one or more of the functions described herein with reference to the control device 200.

Turning also to FIG. 4, the mobile device 104 can comprise communication component 402, scheduling component 404, DCI and incremental DCI component (DID) component 406, memory 408 and/or processor 410. In some embodiments, one or more of communication component 402, scheduling component 404, DCI and incremental DCI component (DID) component 406, memory 408 and/or processor 410 can be electrically and/or communicatively coupled to one another to perform one or more functions of mobile device 104.

In some embodiments, the communication component 402 can receive information regarding one or more DCI (either a base DCI or an incremental DCI). The DCI and incremental DCI component (DID) component 406 can determine the contents of one or more of a DCI and/or incremental DCI received by the mobile device 104 from the BS device. The scheduling component 404 can then transmit data traffic on the data traffic channel specified by the base DCI scheduling grant and/or the incremental DCI scheduling grant.

The memory 408 can be a computer-readable storage medium storing computer-executable instructions and/or information configured to perform one or more of the functions described herein with reference to the mobile device 104. For example, in some embodiments, the memory 408 can store computer-readable storage media associated with determining information transmitted in the incremental DCI and/or base DCI, transmitted according to scheduling specified in the scheduling grants and the like. The processor 410 can perform one or more of the functions described herein with reference to the mobile device 104.

In one or more embodiments, the systems, methods and/or computer-readable storage medium support multi-PDSCH systems (such as that described with reference to the DCI and incremental DCI of system 200), however, one or more embodiments can also serve as the signaling to grant a single PDSCH with high granular information. In that embodiment in which a single DCI is employed for each PDSCH (such as that shown in FIG. 1, system 100), the single DCI for each PDSCH can also include additional incremental DCI to communicate additional information that may not be included in the base DCI.

Incremental DCI can be a DCI with a smaller size than the size of a base DCI. In one embodiment, the mobile device 104 can blind decode a search space of the base DCI. The search space of the base DCI can be specified with an order of blind decoding (or a hierarchical structure). In some embodiments, the order is that the BS device 102 and/or network controls the mobile device 104 so the DID component 406 of the mobile device 104 can decode the base DCI first and then decode the incremental DCI received at the mobile device 104. The mobile device 104 can follow the order to blind decode possible PDCCH.

In one embodiment, the communication component 302 of the BS device 102 and/or network can transmit base DCI before transmitting incremental DCI. In some embodiments, following the blind decoding order, the mobile device 104 can decode the base DCI before decoding the incremental DCI based on information in the search space of the base DCI that tells the mobile device 104 where to search to find the incremental DCI information.

In some embodiments, the size of incremental DCI can be determined by the content of base DCI. For example, two bits in the base DCI (which can be 44 bits long in some embodiments) can indicate four different sizes of the following DCI (based on the various arrangements of zeros and ones in the two bits). For example, in some embodiments, the mobile device 104 can evaluate the base DCI and determine that the incremental DCI is only 30 bits long and the mobile device 104 need only evaluate the 30 bits.

In some embodiments, the basic principle of the operation of the downlink control channel in the embodiments describe herein is that the mobile device 104 performs blind search (e.g., the DID component 406 performs blind search). The order of search is also left to right in the payload in some embodiments. The mobile device 104 knows the payload size of the base DCI and of an incremental DCI before performing the search. The incremental DCI will have a smaller size (e.g., smaller payload size) than the size (e.g., payload size) of the base DCI.

In some embodiments, the base DCI and the incremental DCI can arrive or be sent to the mobile device 104 during an overlapping time period (or at the same time) from the DCI component 306 and from the incremental DCI component 308 of the BS device 102 and/or network. The communication component 402 of the mobile device 104 can receive the DCI and the incremental DCI. The DID component 406 of the mobile device 104 can first blind decode the base DCI. After successful decoding of the base DCI, the mobile device 104 can see the bits in the base DCI and the four bits in the base DCI will inform the mobile device 104 to decode a smaller size/amount of data at the payload for the incremental DCI (e.g., 16 different locations can be designated for searching the base DCI to know where the incremental DCI is located).

When the mobile device 104 has successfully decoded the base DCI, the mobile device 140 can blind decode the rest of the search space (e.g., then searching the search space associated with the incremental DCI) assuming the incremental DCI size indicated in the base DCI.

In another embodiment, the BS device 104 and/or network can indicate the features of base DCI (e.g., the 44 bits typically associated with the base DCI). The network can say which part of the 44 bits is the same in the incremental DCI. As such, the incremental DCI does not have to actually have this information but the mobile device 104 can assume that the information is the same as the information in the base DCI). Thus, there can be an assumption that information not included in the incremental DCI is the same as the information already decoded by the mobile device 104 in the base DCI.

The mobile device 104 can assume that only the information that is different or new relative to the information in the base DCI is included in the incremental DCI. For example, if the PDSCH resource allocation is common to the base DCI and the incremental DCI, then the BS device 102 and/or network can indicate this by specifying 1 bit either in the base DCI or in the incremental DCI. Similarly, if the modulation for each PDSCH is the same, then the BS device 102 and/or network can indicate either in the base DCI or in the incremental DCI thereby reducing the signaling overhead for the incremental DCI.

Effectively, one or more embodiments can provide a DCI framework that allows flexibility on the DCI size (e.g., in conventional systems, LTE uplink DCI and downlink DCI are forced to be the same size to simplify the mobile device blind decoding effort). Using one or more embodiments herein, there is no need to have the same size for any of the DCIs.

FIGS. 5, 6, 7, 8 and 9 illustrate flowcharts of methods that facilitate incremental DCI design to support DCI scheduling in a wireless communication system in accordance with one or more embodiments described herein.

Figure 5:
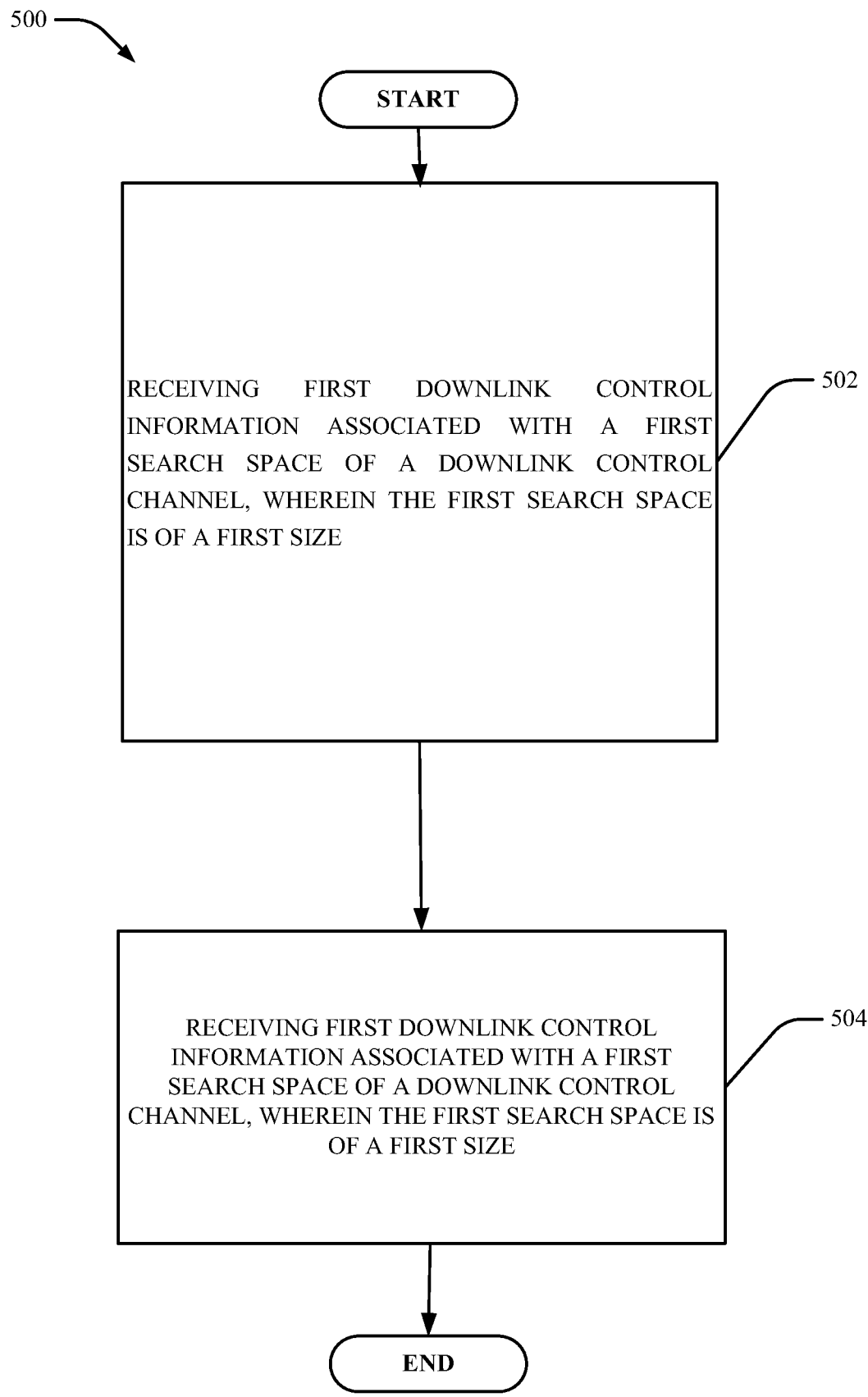
FIGS. 5, 6, 7, 8 and 9 illustrate flowcharts of methods that facilitate incremental DCI design to support DCI scheduling in a wireless communication system in accordance with one or more embodiments described herein.

Turning first to FIG. 5, at 502, method 500 can comprise receiving first downlink control information associated with a first search space of a downlink control channel, wherein the first search space is of a first size. At 504, method 500 can comprise receiving second downlink control information associated with a second search space of the downlink control channel, wherein the second search space is of a second size that is less than the first size, and wherein the second downlink control information comprises incremental downlink control information that is distinct from the first downlink control information.

In some embodiments, the first downlink control information is associated with baseline downlink control information that comprises a first scheduling grant for first user data packet to be transmitted from a mobile device to the apparatus, and wherein the baseline downlink control information specifies first user data packet on a first downlink traffic channel. In some embodiments, the incremental downlink control information comprises a second scheduling grant for second user data packet to be transmitted from the mobile device to the apparatus, and wherein the incremental downlink control information specifies second user data packet on a second downlink traffic channel.

Figure 6:
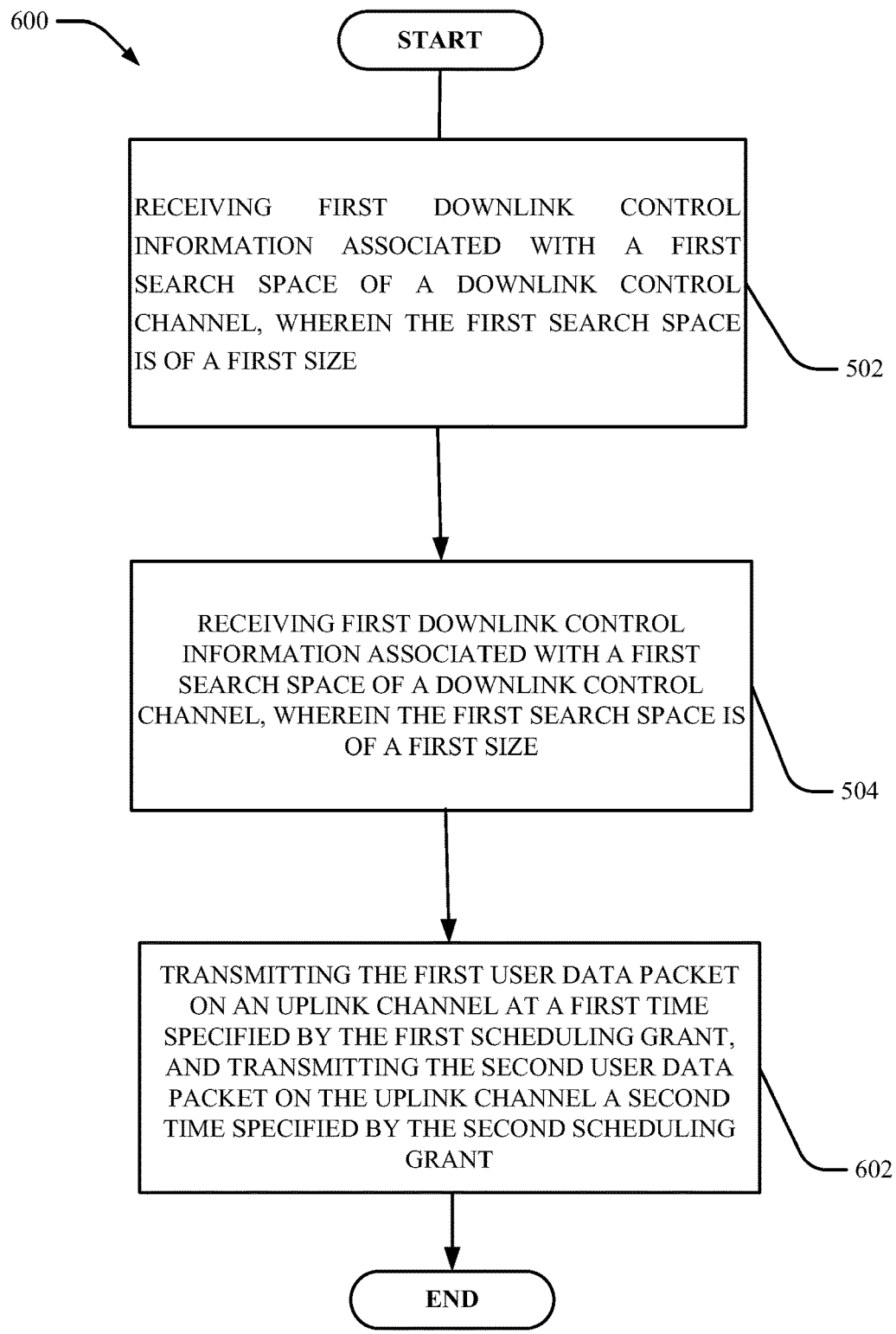

Turning now to FIG. 6, method 600 can comprise the steps 502 and 504. at 602, method 600 can comprise transmitting the first user data packet on an uplink channel at a first time specified by the first scheduling grant, and transmitting the second user data packet on the uplink channel a second time specified by the second scheduling grant.

In some embodiments, although not shown, method 600 can comprise, after the receiving the first downlink control information, blind decoding the first search space to determine a location within the second search space at which to decode the second downlink control information. In some embodiments, the location within the second search space at which to decode the second downlink control information is specified by bits within the first search space.

Figure 7:
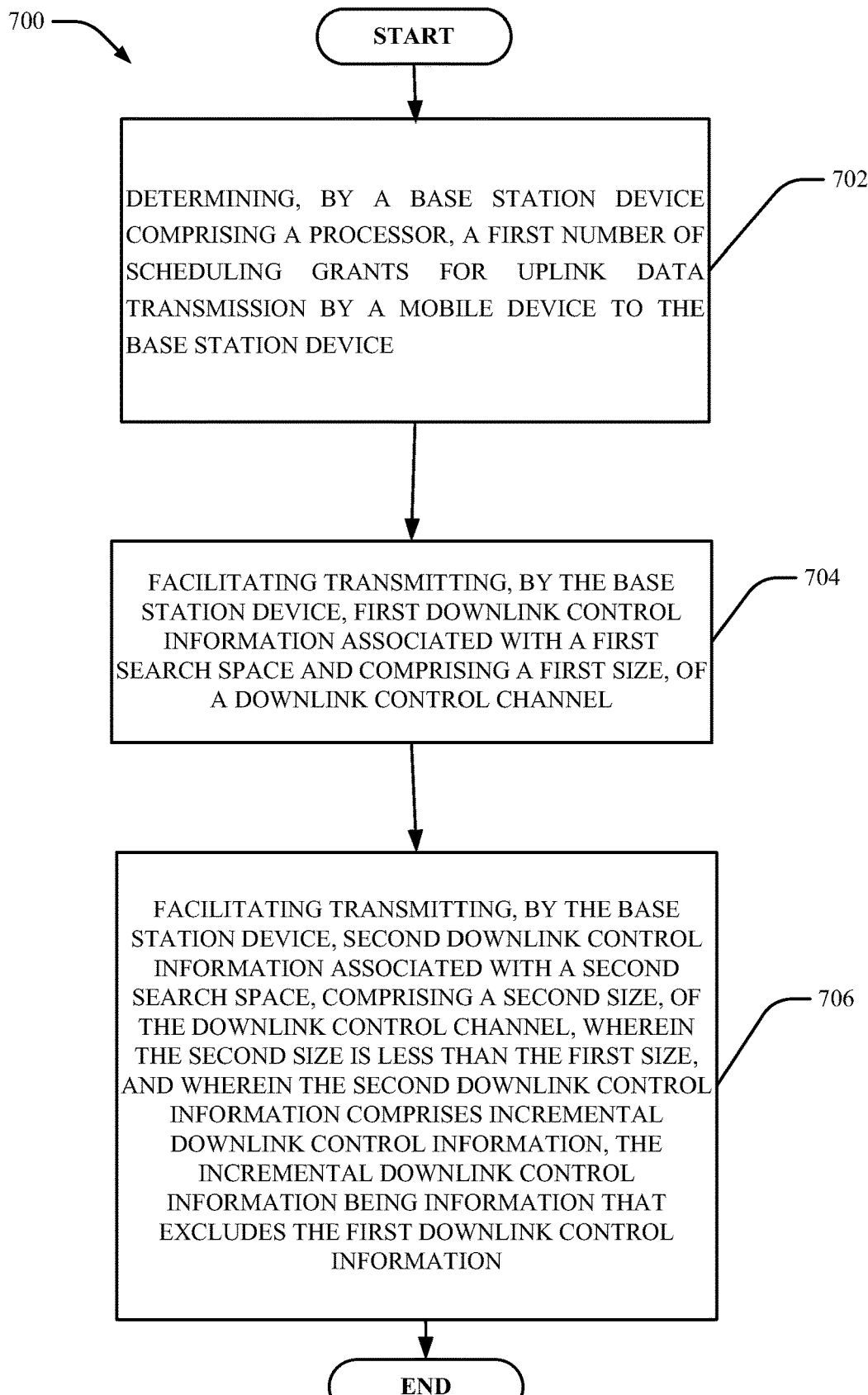

Turning now to FIG. 7, at 702, method 700 can comprise determining, by a base station device comprising a processor, a first number of scheduling grants for uplink data transmission by a mobile device to the base station device. At 704, method 700 can comprise facilitating transmitting, by the base station device, first downlink control information associated with a first search space and comprising a first size, of a downlink control channel. At 706, method 700 can comprise facilitating transmitting, by the base station device, second downlink control information associated with a second search space, comprising a second size, of the downlink control channel, wherein the second size is less than the first size, and wherein the second downlink control information comprises incremental downlink control information, the incremental downlink control information being information that excludes the first downlink control information.

In some embodiments, the first downlink control information comprises a first scheduling grant for first user data packet to be transmitted from a mobile device to the base station device, and wherein the baseline downlink control information specifies first user data packet on a first downlink traffic channel. In some embodiments, the second downlink control information is incremental downlink control information that comprises a second scheduling grant for second user data packet to be transmitted from the mobile device to the base station device.

In some embodiments, the method 700 can comprise receiving, by the base station device, the first user data packet via an uplink channel at a first time specified by the first scheduling grant; and receiving, by the base station device, the second user data packet via the uplink channel a second time specified by the second scheduling grant.

In some embodiments, prior to the facilitating the transmitting the first downlink control information, embedding, in the first downlink control information, bits indicative of a location within the second search space at which the incremental downlink control information is positioned. In some embodiments, the location within the second search space at which the second downlink control information is positioned is specified by two bits within the first search space.

Figure 8:
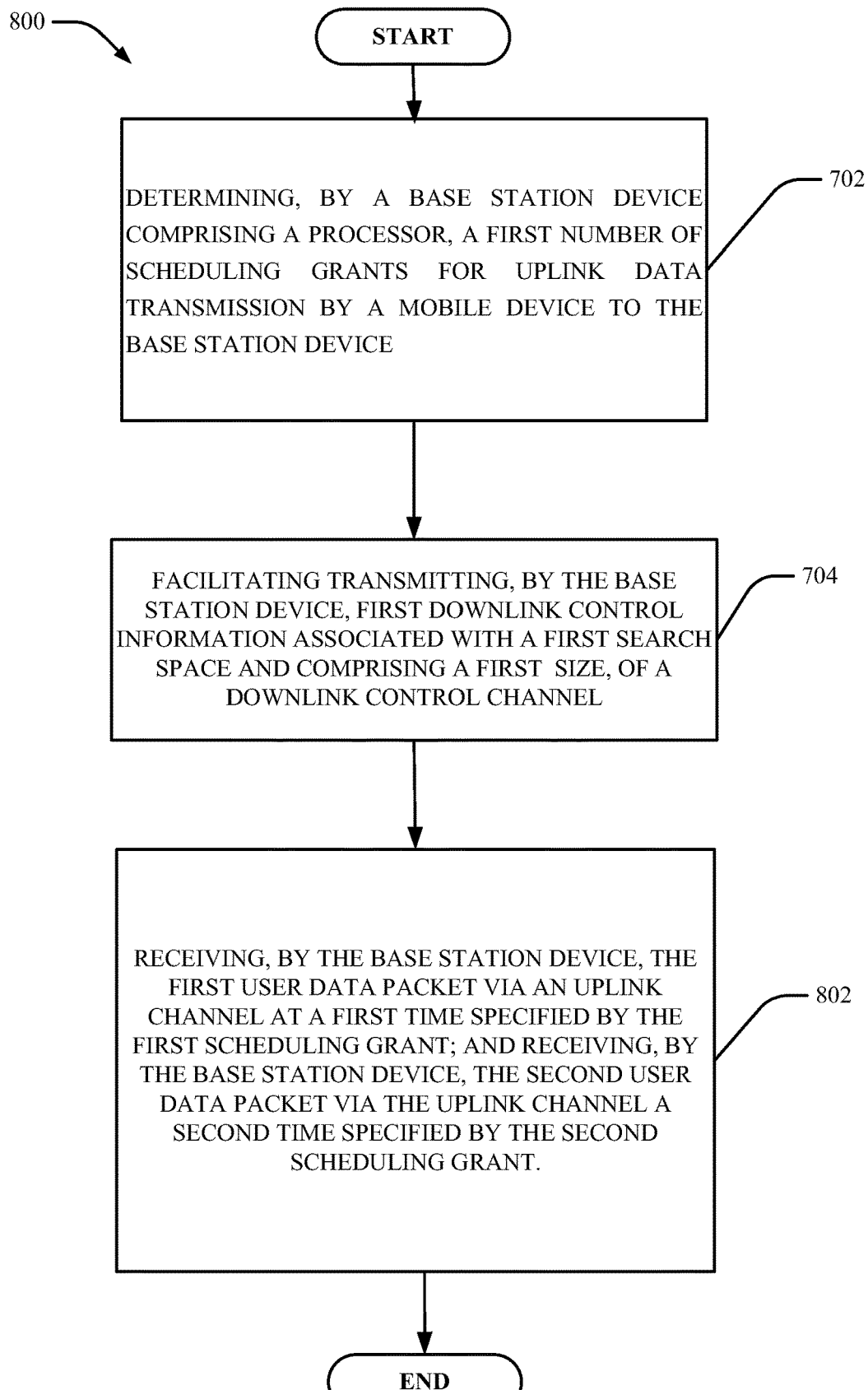

Turning now to FIG. 8, 702, 704 of method 700 can be the first two steps of method 800. At 802, method 800 can comprise receiving, by the base station device, the first user data packet via an uplink channel at a first time specified by the first scheduling grant; and receiving, by the base station device, the second user data packet via the uplink channel a second time specified by the second scheduling grant.

Figure 9:
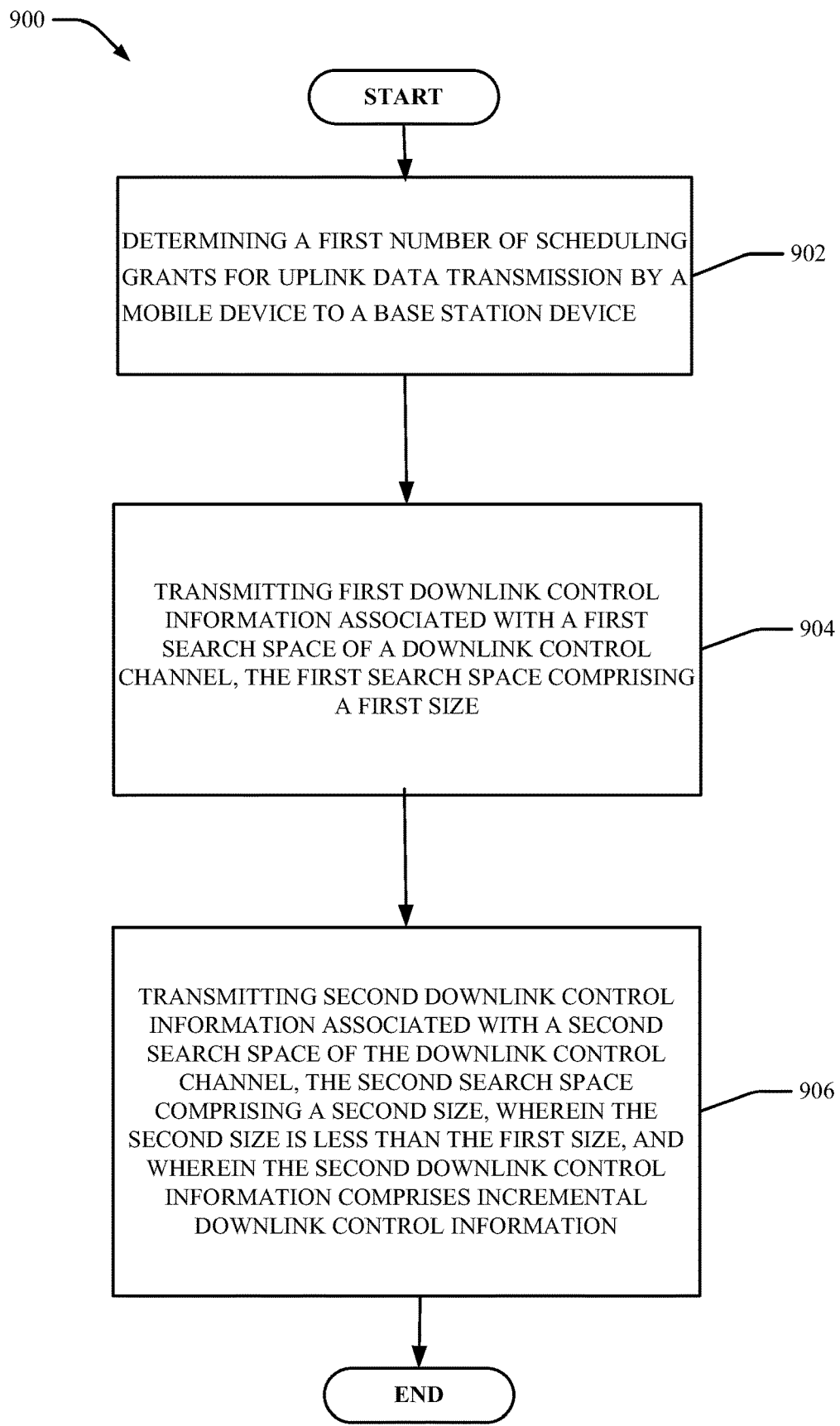

Turning now to FIG. 9, at 902, method 900 can comprise determining a first number of scheduling grants for uplink data transmission by a mobile device to a base station device. At 904, method 900 can comprise transmitting first downlink control information associated with a first search space of a downlink control channel, the first search space comprising a first size. At 906, method 900 can comprise transmitting second downlink control information associated with a second search space of the downlink control channel, the second search space comprising a second size, wherein the second size is less than the first size, and wherein the second downlink control information comprises incremental downlink control information.

In some embodiments, the first downlink control information is a non-incremental downlink control information comprising a first scheduling grant for first user data packet to be transmitted from a mobile device to the base station device, and wherein the non-incremental downlink control information specifies the first user data packet on a first downlink traffic channel. In some embodiments, the second downlink control information is the incremental downlink control information that comprises a second scheduling grant for second user data packet to be transmitted from the mobile device to the base station device, and wherein the incremental downlink control information specifies the second user data packet on a second downlink traffic channel.

In some embodiments, the method can also comprise receiving the first user data packet on an uplink channel at a first time specified by the first scheduling grant, and receiving the second user data packet on the uplink channel at a second time specified by the second scheduling grant. In some embodiments, the method comprises, prior to the transmitting the first downlink control information, embedding, in the first downlink control information, bits indicative of a location within the second search space at which the incremental downlink control information is to be accessed. The location can be within the second search space at which the second downlink control information is to be accessed is specified by two bits within the first search space. In some embodiments, the incremental downlink control information is and distinct from information in the first downlink control information.

Figure 10:
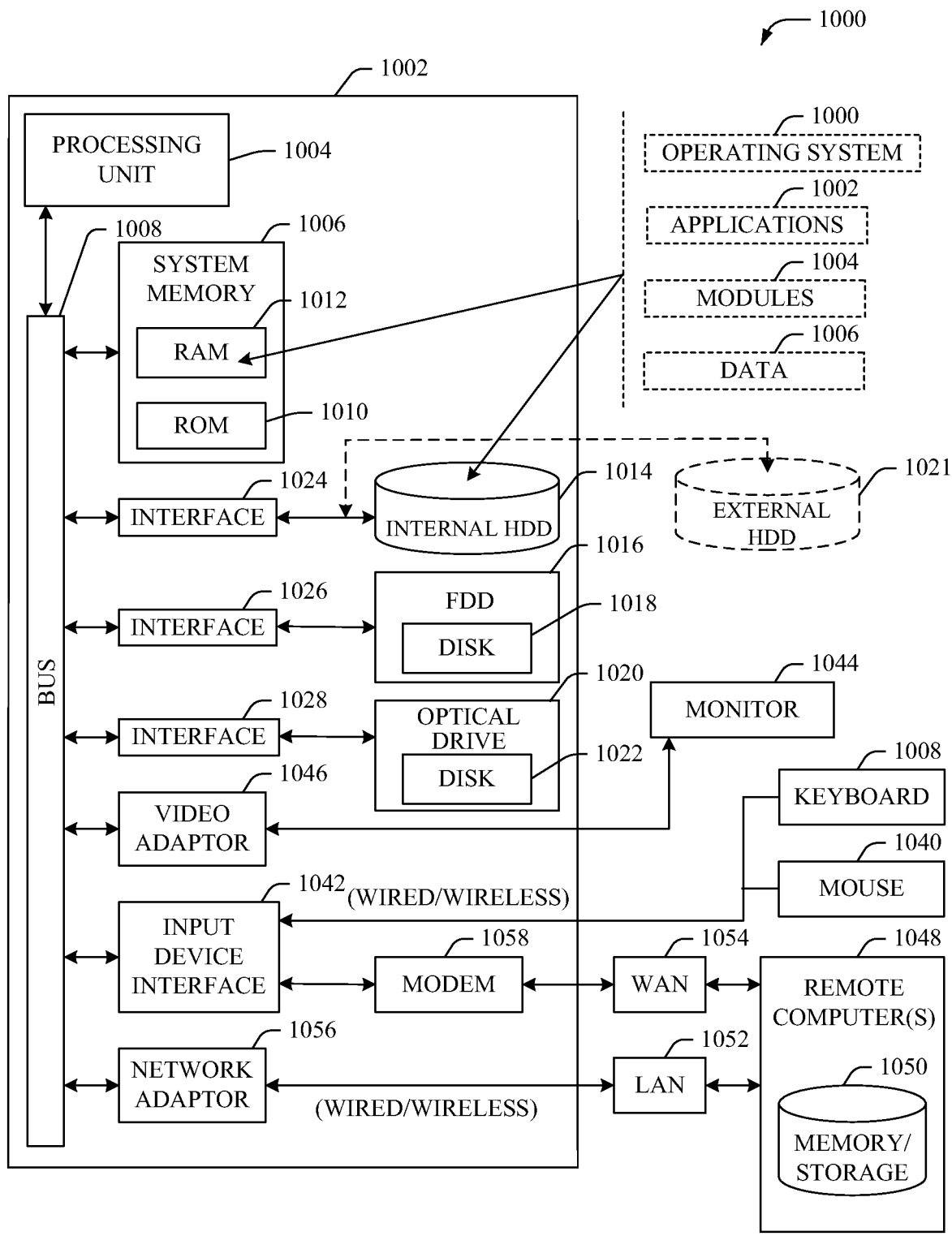
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
      receiving first downlink control information associated with a first search space of a downlink control channel, wherein the first search space is of a first size; and
      receiving second downlink control information, wherein the second downlink control information comprises incremental downlink control information, wherein the incremental downlink control information comprises a first scheduling grant for a first user data packet to be transmitted from a device to the apparatus, and wherein the incremental downlink control information specifies the first user data packet on a first downlink traffic channel, and wherein baseline downlink control information schedules a rank 1 physical downlink shared channel while the incremental downlink control information schedules a subband high rank physical downlink shared channel with a second rank higher than rank 1.

2. The apparatus of claim 1, wherein the subband high rank physical downlink shared channel with the second rank higher than rank 1 is configured with a capability to overwrite scheduling based on the baseline downlink control information.

3. The apparatus of claim 1, wherein the first downlink control information is associated with baseline downlink control information that comprises a second scheduling grant for a second user data packet to be transmitted from the device to the apparatus.

4. The apparatus of claim 3, wherein the baseline downlink control information specifies the second user data packet on a first downlink traffic channel.

5. The apparatus of claim 3, wherein the operations further comprise:
   transmitting the second user data packet on an uplink channel at a first time specified by the second scheduling grant; and
   transmitting the first user data packet on the uplink channel at a second time specified by the first scheduling grant.

6. The apparatus of claim 1, wherein the operations further comprise, after the receiving the first downlink control information, blind decoding the first search space to determine a location within a second search space at which to decode the second downlink control information.

7. The apparatus of claim 6, wherein the location within the second search space at which to decode the second downlink control information is specified by bits within the first search space.

8. A method, comprising:
   receiving, by a system coupled to a processor, first downlink control information associated with a first search space of a downlink control channel, wherein the first search space is of a first size; and
   receiving, by the system, second downlink control information, wherein the second downlink control information comprises incremental downlink control information, wherein the incremental downlink control information comprises a first scheduling grant for a first user data packet to be transmitted from a device to the system, and wherein the incremental downlink control information specifies the first user data packet on a first downlink traffic channel, and wherein baseline downlink control information schedules a rank 1 physical downlink shared channel while the incremental downlink control information schedules a subband high rank physical downlink shared channel with a second rank higher than rank 1.

9. The method of claim 8, wherein the subband high rank physical downlink shared channel is configured to overwrite scheduling based on the baseline downlink control information.

10. The method of claim 8, wherein the first downlink control information is associated with baseline downlink control information that comprises a second scheduling grant for a second user data packet to be transmitted from the device to the apparatus.

11. The method of claim 10, wherein the baseline downlink control information specifies the second user data packet on a first downlink traffic channel.

12. The method of claim 10, further comprising:
transmitting, by the system, the second user data packet on an uplink channel at a first time specified by the second scheduling grant; and
transmitting, by the system, the first user data packet on the uplink channel a second time specified by the first scheduling grant.

13. The method of claim 8, further comprising:
after the receiving the first downlink control information, blind decoding, by the system, the first search space to determine a location within a second search space at which to decode the second downlink control information.

14. The method of claim 13, wherein the location within the second search space at which to decode the second downlink control information is specified by bits within the first search space.

15. A non-transitory machine-readable medium, comprising executable instructions that, when executed by a processor, facilitate performance of operations, comprising:
receiving first downlink control information associated with a first search space of a downlink control channel, wherein the first search space is of a first size; and receiving second downlink control information, wherein the second downlink control information comprises incremental downlink control information, wherein the incremental downlink control information comprises a first scheduling grant for a first user data, packet to be transmitted from a device to an apparatus, and wherein the incremental downlink control information specifies the first user data packet on a first downlink traffic channel, and wherein baseline downlink control information schedules a rank 1 physical downlink shared channel while the incremental downlink control information schedules a subband high rank physical downlink shared channel with a second rank higher than rank 1.

16. The non-transitory machine-readable medium of claim 15, wherein the subband high rank physical downlink shared channel is configured to overwrite scheduling based on the baseline downlink control information.

17. The non-transitory machine-readable medium of claim 15, wherein the first downlink control information is associated with baseline downlink control information that comprises a second scheduling grant for a second user data packet to be transmitted from the device to the apparatus.

18. The non-transitory machine-readable medium of claim 17, wherein the baseline downlink control information specifies the second user data packet on a first downlink traffic channel.

19. The non-transitory machine-readable medium of claim 15, wherein the operations further comprise: transmitting the second user data packet on an uplink channel at a first time specified by the second scheduling grant; and transmitting the first user data packet on the uplink channel at a second time specified by the first scheduling grant.

20. The non-transitory machine-readable medium of claim 15, wherein the operations further comprise: after the receiving the first downlink control information, blind decoding the first search space to determine a location within a second search space at which to decode the second downlink control information.

* * * * *